US010074030B2

(12) United States Patent
Van Eeuwijk et al.

(10) Patent No.: US 10,074,030 B2
(45) Date of Patent: Sep. 11, 2018

(54) VERIFICATION OF IMAGES CAPTURED USING A TIMESTAMP DECODED FROM ILLUMINATION FROM A MODULATED LIGHT SOURCE

(71) Applicant: PHILIPS LIGHTING HOLDING B.V., Eindhoven (NL)

(72) Inventors: Alexander Henricus Waltherus Van Eeuwijk, Eindhoven (NL); William Nathan Chelton, Amsterdam (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/311,160

(22) PCT Filed: Apr. 28, 2015

(86) PCT No.: PCT/EP2015/059116
§ 371 (c)(1),
(2) Date: Nov. 14, 2016

(87) PCT Pub. No.: WO2015/173001
PCT Pub. Date: Nov. 19, 2015

(65) Prior Publication Data
US 2017/0124421 A1     May 4, 2017

(30) Foreign Application Priority Data

May 12, 2014   (EP) .................................... 14167836

(51) Int. Cl.
*G06K 9/46*     (2006.01)
*G06K 9/00*     (2006.01)
(Continued)

(52) U.S. Cl.
CPC ......... *G06K 9/4661* (2013.01); *G06F 21/602* (2013.01); *G06K 9/00288* (2013.01);
(Continued)

(58) Field of Classification Search
CPC ............. G06K 9/4661; G06K 9/00288; G06K 9/4676; G06K 9/4671; G06K 9/469;
(Continued)

(56) References Cited

U.S. PATENT DOCUMENTS 9,379,814 B2 * 6/2016 De Bruijn .......... H05B 37/0272
9,453,904 B2 * 9/2016 Moshfeghi ............ G01S 5/0263
(Continued)

FOREIGN PATENT DOCUMENTS

DE        10143518 A1    3/2003
EP         1460841 A1    9/2004
(Continued)

*Primary Examiner* — Pritham Prabhakher
(74) *Attorney, Agent, or Firm* — Meenakshy Chakravorty

(57) ABSTRACT

A device comprising: an input for receiving images captured by a camera, of an environment illuminated by light from a light source; an image processing module; and a verification module. The image processing module is configured to process one or more of the images to decode a timestamp modulated into the light, and to output an indication of the decoded timestamp. The verification module is arranged to receive the indication of the decoded timestamp output by the image processing module, and based thereon to perform an at least partially automated verification of a time at which the one or more images were captured.

14 Claims, 4 Drawing Sheets

(51) Int. Cl.
*H04N 5/225* (2006.01)
*H04B 10/116* (2013.01)
*G06F 21/60* (2013.01)

(52) U.S. Cl.
CPC ......... *H04B 10/116* (2013.01); *H04N 5/2256* (2013.01); *G06F 2221/2151* (2013.01)

(58) Field of Classification Search
CPC .. G06K 9/48; G06K 9/52; G06K 9/46; G06K 9/4604; G06K 9/4609; G06K 2009/4666; H04N 5/2256; H04B 10/116; G06F 21/602; G06F 2221/2151
USPC ...................................................... 348/222.1
See application file for complete search history.

(56) References Cited

U.S. PATENT DOCUMENTS

| | | | |
|---|---|---|---|
| 9,646,384 B2 * | 5/2017 | Lee | G06T 7/73 |
| 9,768,958 B2 * | 9/2017 | Liu | H04L 9/0869 |
| 2001/0031073 A1 * | 10/2001 | Tajima | G06K 9/00228 |
| | | | 382/118 |
| 2003/0204738 A1 | 10/2003 | Morgan | |
| 2004/0125208 A1 | 7/2004 | Malone et al. | |
| 2007/0266252 A1 | 11/2007 | Davis et al. | |
| 2008/0129758 A1 | 6/2008 | Fox et al. | |
| 2008/0233984 A1 | 9/2008 | Franklin | |
| 2008/0310850 A1 | 12/2008 | Pederson et al. | |
| 2009/0067667 A1 | 3/2009 | Jabri | |
| 2009/0084847 A1 * | 4/2009 | He | G06K 7/10722 |
| | | | 235/455 |
| 2009/0184982 A1 | 7/2009 | Takakura et al. | |
| 2009/0280838 A1 | 11/2009 | Malik et al. | |
| 2009/0284366 A1 | 11/2009 | Haartsen et al. | |
| 2010/0241723 A1 | 9/2010 | Dornbush | |
| 2011/0288917 A1 | 11/2011 | Wanek et al. | |
| 2012/0153868 A1 * | 6/2012 | Gu | H05B 37/0227 |
| | | | 315/307 |
| 2012/0249586 A1 | 10/2012 | Wither et al. | |
| 2012/0310720 A1 | 12/2012 | Balsan et al. | |
| 2013/0141555 A1 * | 6/2013 | Ganick | G01S 1/70 |
| | | | 348/61 |
| 2013/0176481 A1 * | 7/2013 | Holmes | H04N 5/2354 |
| | | | 348/370 |
| 2013/0278787 A1 | 10/2013 | Shpunt | |
| 2014/0006162 A1 | 1/2014 | Ennis et al. | |
| 2014/0191682 A1 * | 7/2014 | Pederson | H04B 10/1143 |
| | | | 315/294 |
| 2014/0314420 A1 * | 10/2014 | De Bruijn | H05B 37/0272 |
| | | | 398/127 |
| 2014/0341588 A1 * | 11/2014 | Pederson | H04B 10/40 |
| | | | 398/128 |
| 2015/0023562 A1 * | 1/2015 | Moshfeghi | G01S 5/0263 |
| | | | 382/106 |
| 2015/0078741 A1 * | 3/2015 | O'Connor | H04B 10/116 |
| | | | 398/23 |
| 2015/0178920 A1 * | 6/2015 | Garnavi | A61B 5/444 |
| | | | 600/476 |
| 2015/0195042 A1 * | 7/2015 | Raskar | H04B 10/502 |
| | | | 398/118 |
| 2015/0317512 A1 * | 11/2015 | Shankaranarayana | |
| | | | G06K 9/00926 |
| | | | 382/118 |

FOREIGN PATENT DOCUMENTS

| | | |
|---|---|---|
| EP | 2503852 A1 | 9/2012 |
| GB | 2462163 A | 2/2010 |
| WO | 03009217 A1 | 1/2003 |
| WO | 2013042017 A1 | 3/2013 |
| WO | 2013072826 A1 | 5/2013 |
| WO | 2013108166 A1 | 7/2013 |

\* cited by examiner

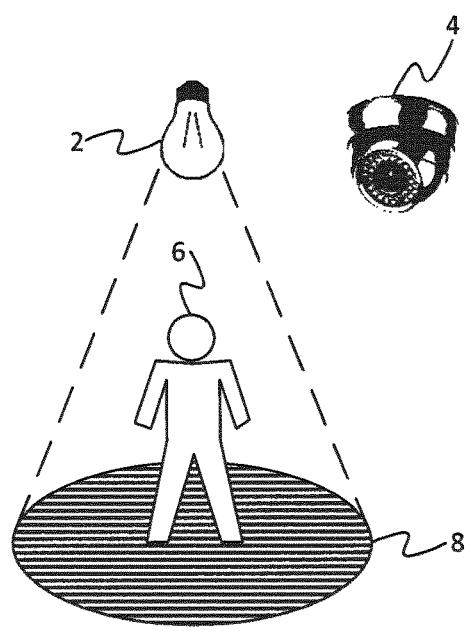
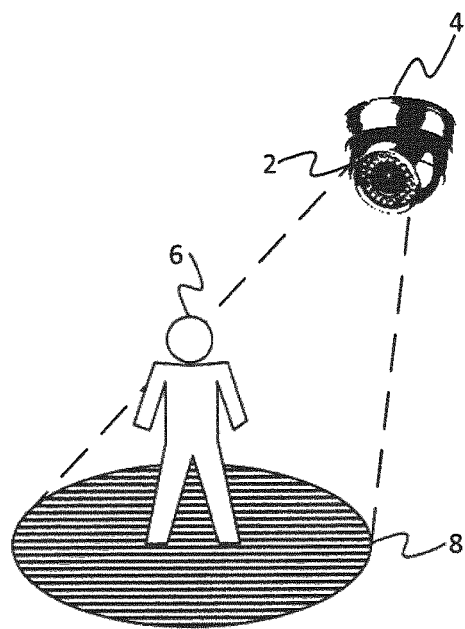
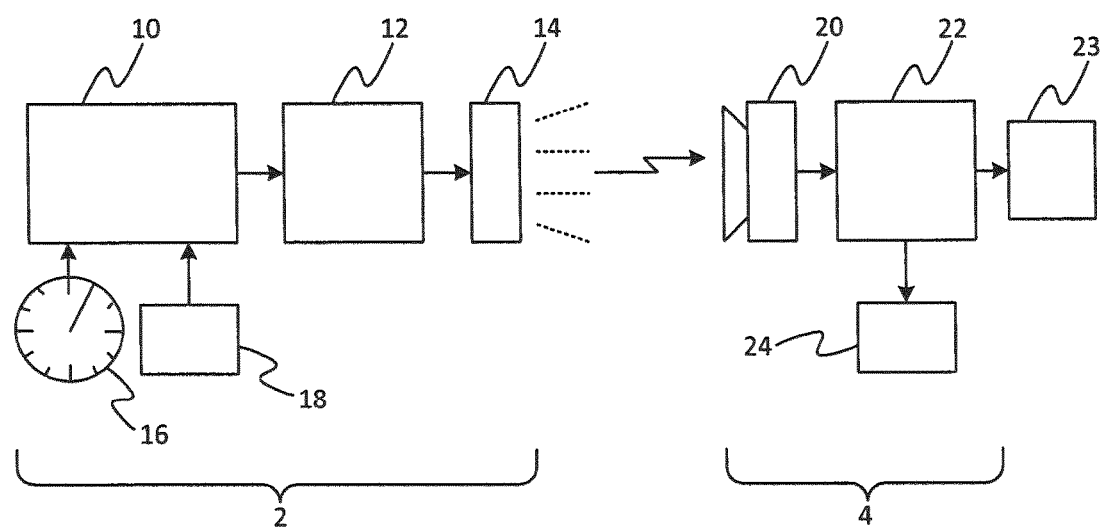

US 10,074,030 B2

VERIFICATION OF IMAGES CAPTURED USING A TIMESTAMP DECODED FROM ILLUMINATION FROM A MODULATED LIGHT SOURCE

CROSS-REFERENCE TO PRIOR APPLICATIONS

This application is the U.S. National Phase application under 35 U.S.C. § 371 of International Application No. PCT/EP2015/059116, filed on Apr. 28, 2015, which claims the benefit of European Patent Application No. 14167836.7, filed on May 12, 2014. These applications are hereby incorporated by reference herein.

TECHNICAL FIELD

The present disclosure relates to the fields of image capture and image processing, for instance by a CCTV camera or other camera such as a handheld consumer camera, and particularly to recording a captured image along with a timestamp recording the time at which the image was captured.

BACKGROUND

Image capture may involve capturing a single still image or a series of images over time. Either way, when the image or images are processed, this may involve associating a respective timestamp with each of the images. The timestamp is added by the camera (e.g. CCTV camera), by tagging or stamping the image or image file with the time from its own internal clock. This provides an indication of the time at which the image was captured.

However, in the case where a time stamp has been associated with an image, there may be a concern that the timestamp has been tampered with. In the case where no time stamp has been associated with an image, this may cause problems in that the time at which the image was captured is not known.

SUMMARY

According to one aspect disclosed herein, there is provided an image capturing system comprising a light source for illuminating an environment with visible light, and image capturing apparatus for capturing and recording images of the environment. The light source is configured to encode a current indication of time into its light output, and the image capturing apparatus comprises a camera configured to capture one or more images of the environment. The image capturing system further comprises an image processing module configured to process one or more of the images to decode a timestamp encoded into the light, and to output an indication of the decoded timestamp; and a verification module arranged to receive the indication of the decoded timestamp output by the image processing module, and based thereon to perform an at least partially automated verification of a time at which the one or more images were captured.

The light source thus effectively has a dual function; i.e. the light source has a primary illumination function and a secondary data communication function. Further, for the/each image, a processor (which may be part of, or separate from, the camera) uses coded-light image processing techniques to determine the timestamp therefrom, and based on this performs an at least partially automated verification of the time at which the image was captured.

The determined time can be associated with the image as an indication of when the image was captured, or it can be used to verify a pre-existing timestamp associated with the image. Thus, the technique can be seen as a kind of "watermarking" which enables verification as to when an image was captured. The timestamp combined with the image material itself can represent a simple "proof of being there". For example when the image depicts a person at a particular location, say near an ATM or near a landmark, the time-stamp in the image together with the image provides a proof that this person was at that location at the timestamp.

In embodiments, in addition to the timestamp, the data modulated into the light further comprises information indicative of a location of the light source or environment, which can be used to verify the location at which the one or more images were captured. For example, this information may comprise coordinates or a name of the location explicitly encoded into the light; or may comprise an identifier of the light source that is mapped to a location in a location database, the image processing module being configured to look up the location from the location database based on this identifier.

In this case the "watermarking" enables verification of when and where an image was captured.

In further embodiments, the verification module is configured to perform said at-least-partially automated verification by comparing the timestamp as currently decoded from said image with a previously determined version of the timestamp, e.g. as determined at the time of capture. For example, the image processing module may be configured to store the one or more images in at least one image file, wherein said outputting may comprise storing the decoded timestamp in the image file as metadata of the image file; the image processing module may be configured to decode the timestamp again later from the one or more stored images; and the verification module may be configured to perform said at-least-partially automated verification by comparing the later decoded timestamp with the stored timestamp in the metadata in order to verify the stored timestamp. Alternatively or additionally, as another example the camera may add its own timestamp to at least one of said one or more the images, and the verification module may be configured to perform said at-least-partially automated verification by comparing the camera's own timestamp with the decoded timestamp in order to verify the camera's timestamp.

According to another aspect disclosed herein, there is provided a device comprising: an input for receiving images captured by a camera, of an environment illuminated by visible light from a light source; an image processing module; and a verification module. The image processing module is configured to process one or more of the images to decode a timestamp encoded into the light, and to output an indication of the decoded timestamp. The verification module is arranged to receive the indication of the decoded timestamp output by the image processing module, and based thereon to perform an at least partially automated verification of a time at which the one or more images were captured.

According to another aspect, there is provided a computer-program product comprising code embodied on a computer-readable medium and configured so as when executed on a device to implement the operations of the image processing module.

According to yet another aspect disclosed herein, there is provided a method comprising: using light emitted from a light source to illuminate an environment; encoding a timestamp indicating a current time value into the light emitted by the light source; using a camera to capture one or more of said environment; processing at least one of the images to determine the timestamp encoded into said light; and based on the time stamp as determined by said processing, performing an at least partially automated verification of a time at which the at least one image was captured.

BRIEF DESCRIPTION OF THE DRAWINGS

To assist understanding of the present disclosure and to show how embodiments may be put into effect, reference is made by way of example to the accompanying drawings in which:

FIG. 1 schematically illustrates a system for emitting light and capturing an image, FIG. 2 illustrates another system for emitting light and capturing an image, FIG. 3 is a schematic block diagram of a light source and camera.

DETAILED DESCRIPTION OF EMBODIMENTS

Figure 4:
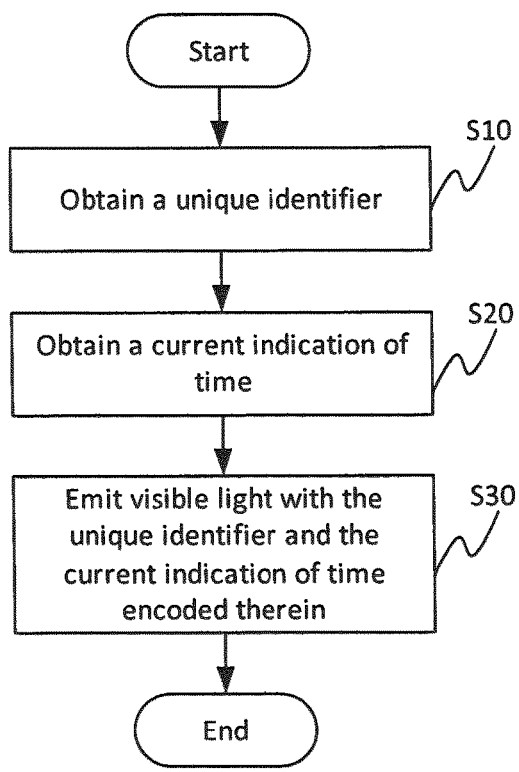
FIG. 4 is a flow chart illustrating a method of emitting light.

FIGS. 1 to 3 show an image capturing system comprising a light source 2 for illuminating an environment comprising one or more objects of interest 6, and image capturing apparatus 4 comprising a camera for capturing images of the environment (including the object or objects of interest). For example the camera 4 may be a security camera such as a CCTV (closed circuit television) camera. The light source 2 and the camera 4 may be separate units, as shown in FIG. 1, or alternatively may be integrated into the same unit as shown in FIG. 2. For instance in the case of FIG. 1, the light source 2 may be a luminaire that is installed or otherwise placed in the environment for a primary purpose of illuminating the environment generally. In the case of FIG. 2, the light source 2 may be a dedicated light source integrated with the camera for the purpose of illuminating the scene to be captured. The object of interest 6 may be a person whose presence at a certain time and/or place is desired to be verified, or any other object desired to be verified as being present at the time and/or place in question.

The light source 2 is configured to encode a current indication of time into its light output. Referring to FIG. 3, the light source 2 comprises a lighting element 14 (e.g. comprising one or more LEDs), and a controller 10 connected via a driver 12 to control the emission of light from the lighting element 14. The light source 2 also comprises or has access to a clock or other form of timer 16, from which it is arranged to derive a current time value indicating a current time (e.g. current date and/or time of day, or time elapsed since some event or defined point). Furthermore the light source 12 may comprise a memory 18 such as a magnetic (e.g. hard disk) or electronic (e.g. flash) memory.

The controller 10 is configured to read the current time value from the clock or timer 16 and encode this into the light emitted by the lighting element 14 by modulating the light using a coded light technique. In embodiments, the controller 10 may optionally also include other information in the coded light, such as an ID of the light source 2. This other information may be retrieved from the memory 18, or received over a network.

Coded light refers to techniques whereby a signal is embedded in the visible light emitted by a light source. The light thus comprises both a visible illumination contribution for illuminating a target environment such as room (typically the primary purpose of the light), and an embedded signal for providing information into the environment. To do this, the light is modulated at a certain modulation frequency or frequencies. For instance, the amplitude of the light may be switched between different levels at high frequency to represent different symbols (amplitude keying), or the modulation frequency may be switched between two or more different frequencies to represent symbols (frequency shift keying). Techniques for encoding data into light will in themselves be familiar to a person skilled in the art.

In embodiments the controller 10 may be implemented in software stored on a memory of the light source 2 (e.g. memory 18) and arranged for execution on a processor of the light source. Alternatively it is not excluded that some or all of the functionality of the controller 10 could be implemented in dedicated hardware circuitry, or configurable or reconfigurable hardware such as a PGA or FPGA. In the case of a partially or wholly software-based implementation, the clock or timer 16 may comprise a general purpose clock or timer of the processor in combination with software of the controller configured to determine the relevant representation of the current time based thereon.

The controller 10 and/or the clock or timer 16 may be integrated into the same unit or fixture as the light source 2, or may be external to it (e.g. providing instructions to the light source 2 over a network).

At the receiver side, the image-capturing apparatus 4 comprises a camera 20 which is configured to capture an image or a series of images of the environment. The image capturing apparatus 4 also comprises an image processing module 22, connected to receive the captured images from the output of the camera 20 and supply them to the image processing module 22. Furthermore, the image capturing apparatus comprises a memory 24 where the captured images are stored.

The image processing module 22 may be implemented as a portion of software stored on a memory of the image capturing apparatus 4 (e.g. memory 24) and arranged for execution on a processor of the image capturing apparatus 4. Alternatively, it is not excluded that some or all of the functionality of the image processing module 22 could be implemented in dedicated hardware circuitry, or configurable or reconfigurable hardware such as a PGA or FPGA. The image processing module 22 may be integrated into the same unit as the camera 20, or may be separate from it (e.g. running on a separate computer).

For each captured image, the image processing module 22 locates the light footprint 8 of the light source in the image, and then uses coded-light image processing techniques to determine therefrom a time at which the image was captured. For instance EP 2,503,852 describes how rolling-shutter type techniques can be used not only to detect the data signaled by the coded light component, but also the spatial footprint of an individual coded light component separated from amongst any other light components in the environment.

Note that it is not necessary for the light source 2 itself to appear in the captured image, as long as light from the light source 2 is captured in the image (e.g. the light may comprise reflected light, or light received through a diffuser).

Figure 8:
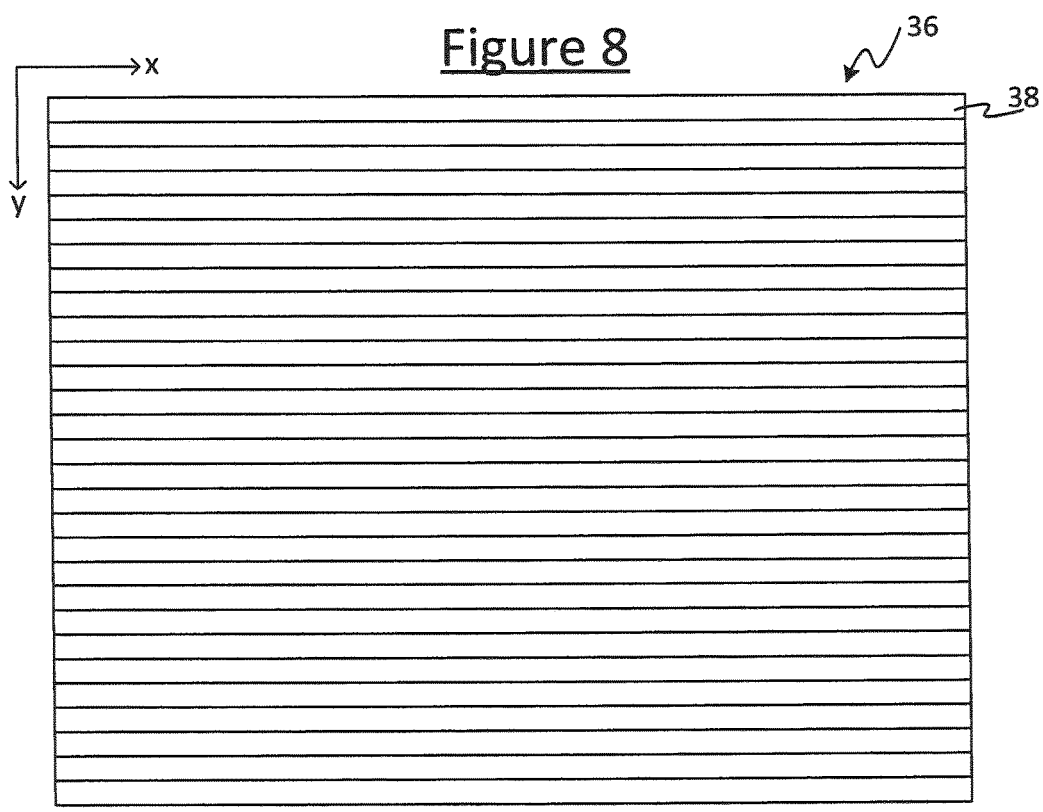

FIG. 8 represents the image capture element 36 of the camera 20. The image capture element 36 comprises an array of pixels for capturing signals representative of light incident on each pixel, e.g. typically a square or rectangular array of square or rectangular pixels. In a rolling-shutter camera, the pixels are arranged into a plurality of lines, e.g. horizontal rows 38, which are exposed in sequence line-by-line. That is, to capture a given frame, first one line 38 is exposed to the light in the target environment, then the next line in the sequence is exposed starting at a slightly later time, and so forth. Typically the sequence "rolls" in order across the frame, e.g. in rows top to bottom, hence the name "rolling shutter". When used to capture coded light, this means different lines within a frame capture the light at different times and therefore, if the line rate is high enough relative to the modulation frequency, at different phases of the modulation waveform. Thus the modulation in the light can be detected.

In WO 2012/127439 for example, it has been disclosed how coded light can be detected using a "rolling shutter" camera of this type. The signal detection exploits the rolling shutter image capture, which causes temporal light modulations to translate to spatial intensity variations over successive image rows of pixels.

The system as presented in WO 2012/127439 illuminates its environment and at the same time superimposes a modulation on the light output that although substantially imperceptible to the unaided human eye, is visible for the rolling shutter camera. The visible light communication system of WO2012/127439 is merely exemplary of the systems that can be used in conjunction with the present invention.

Figure 9:
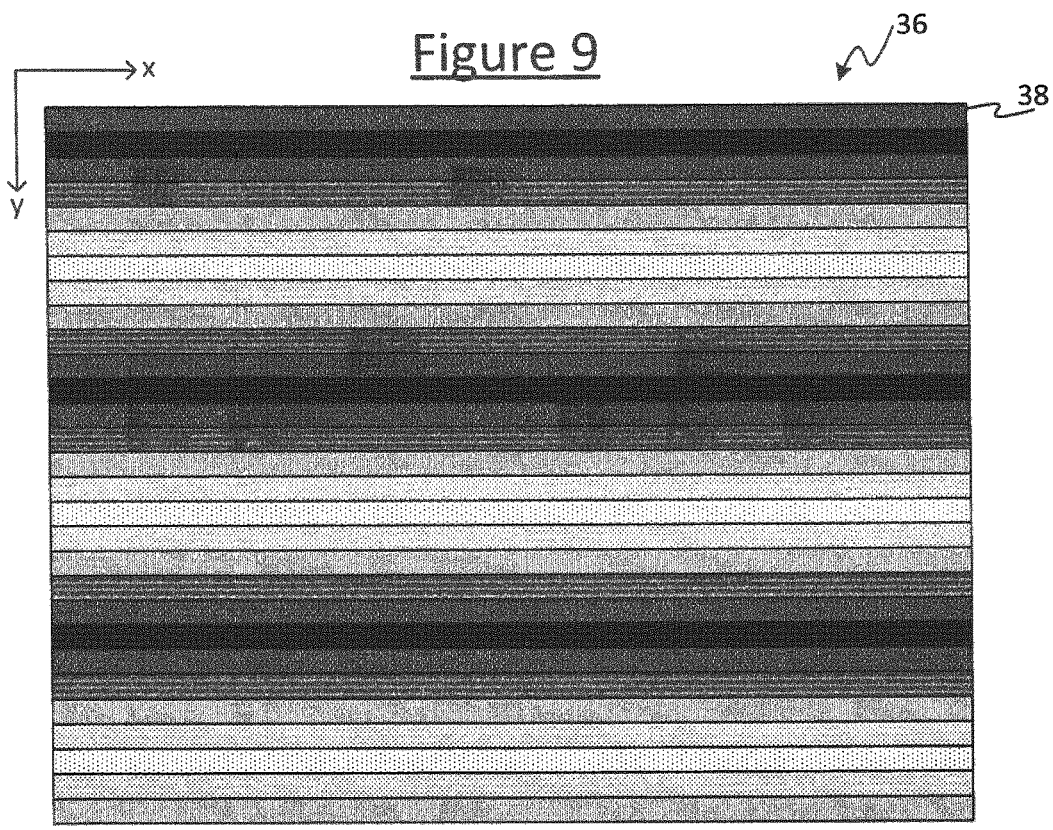

This is illustrated schematically in FIG. 9. As each successive line 38 is exposed, it is exposed at a slightly different time and therefore (if the line rate is high enough compared to the modulation frequency) at a slightly different phase of the modulation. Thus each line 38 is exposed to a respective instantaneous level of the modulated light. This results in a pattern of stripes which undulates or cycles with the modulation over a given frame. Based on this principle, the image processing module 22 is able to detect coded light components modulated into light received by the camera 20.

In FIGS. 1 and 2, the encoding of the light is depicted as causing "stripes" in the light footprint 8 of the light source 2. It will be appreciated that the encoding will be imperceptible to the human eye, but will be apparent as stripes in an image captured by the camera 20 due to its use of a rolling-shutter image sensor 36.

In alternative embodiments, it is also possible to capture coded light using a global shutter camera if the frame rate is high enough relative to the modulation frequency of the data in the coded light signal.

The steps performed by the light source 2 are summarized in FIG. 4. At step S10 the controller 10 of the light source 2 retrieves an ID of the light source from its memory 18 (or receives it over a network). The ID uniquely identifies the light source amongst a plurality of other light sources within a certain system (which in embodiments may each emit light encoded with their own respective IDs), e.g. within a room, building or complex. At step S20 the controller 10 also obtains an indication of the current time from the clock or timer 16 of the light source 2 (or receives this over a network). At step S30, the controller 10 then controls the lighting element 14 of the light source 2 to emit light modulated according to a suitable coded light technique, so as to encode the ID and time into the emitted light.

Notably, instead of (or in addition to) transmitting a unique identifier and a current indication of time, the light source may provide a cryptographically verifiable timestamp. For example the timestamp may be encrypted using a symmetric or an asymmetric cipher, thereby requiring receiving parties to decrypt the timestamp. Alternatively the timestamp may be combined with a digitally signed cryptographic message digest or hash of the message. In this manner the time-stamp remains in clear form and parties in possession of the proper key can verify message authenticity, by matching the timestamp with the accompanying message digest or hash.

The particular solution to choose may depend on the application and requirements. For example, should the timestamp be available in the clear, the choice may depend on whether the coded light information channel has sufficient bandwidth to accommodate the overhead of a digitally signed hash. For still images that have limited bandwidth, encryption may be most suitable because it does not add additional bits, whereas for higher bandwidth application such as video (which consists of multiple image frames) the inclusion of a plain text timestamp with a digitally signed hash may be beneficial because it also provide the timestamp in the clear.

Figure 5:
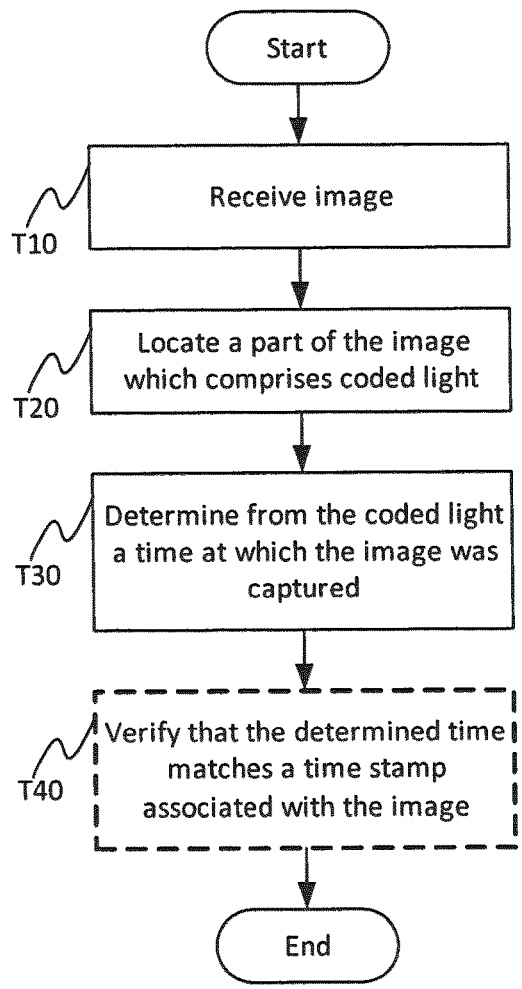
FIG. 5 is a flow chart illustrating a method of capturing and processing an image, FIG. 6 schematically illustrates a captured image with incorporated graphical element, FIG. 7 schematically illustrates an image file with metadata, FIG. 8 schematically illustrates an image capture element of a rolling-shutter camera, and FIG. 9 schematically illustrates the capture of modulated light by rolling shutter.

The steps performed by the receive side apparatus 4 are summarized in FIG. 5. At step T10 the camera 20 receives the light (directly and/or reflected) from the light source 2 and thereby captures an image (or images) of the environment. The image is stored in a memory, e.g. memory 18. At step T20, the image processing module 22 locates the part of the image which comprises the coded light from the light source 2 in question based on its ID (i.e. locates the "footprint" 8 of the coded light). For example this may be performed in accordance with the techniques set out in EP 2,503,852. At step T30, the image processing module 22 decodes the coded light as appearing in the image, in order to read the timestamp.

The image processing module then outputs an indication of the timestamp in association with the image, so that at step T40 it can be used to verify the time at which the image (or images) was (or were) captured, and hence that the one or more object of interest 6 appearing in the image were present in the environment in question at that time.

The indication of the timestamp may be output verbatim in the form it was received, or may be interpreted or reformatted to be output in a different form. For instance it could be interpreted from a computer-readable form to a human-readable form, and/or reduced from a higher time resolution to a lower timer resolution (e.g. if the timestamp is accurate to a higher degree than of interest, e.g. second or milliseconds, the image processing module 22 may output in terms of only, say, minutes, hours or even just date).

There are a number of options for how the outputted timestamp is used.

Figure 7:
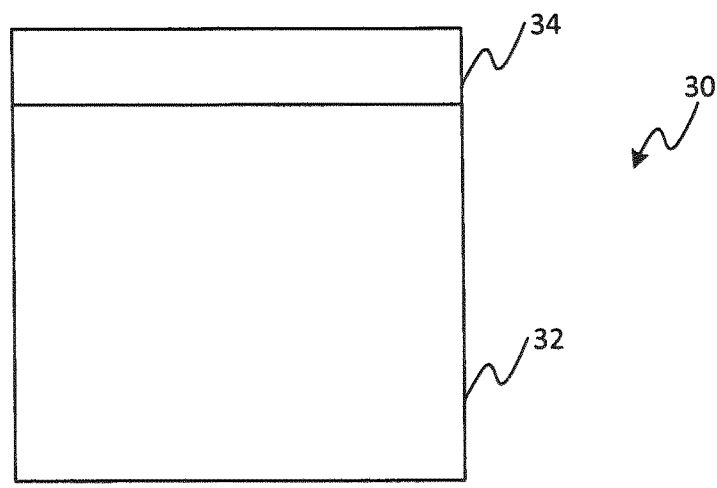

For example as illustrated in FIG. 7, the image processing module 22 may be configured to store an indication of the timestamp in metadata 34 of the image file 30. When the image processing module 22 captures the one or more images 22, it records them by storing them in at least one image file 30 (e.g. multiple images per file in the case of a video, or a different file per image in the case of still images).

The image file 30 comprises a portion of image data 32 which represents the actual graphical part of the image that will be viewed on screen, i.e. the actual pixels. But the image file 30 also comprises a metadata portion 34 (e.g. a header or side information) comprising data which is not part of the image per se, but which is associated with it.

In embodiments, the timestamp is not (or at least is not only) output to the user for the user to verify the time, but is output to a verification module 23 to perform an at least partially automated verification procedure (refer again to FIG. 3). The verification module 23 may be implemented as another portion of software stored on a memory of the image capturing apparatus 4 (e.g. memory 24) and arranged for execution on a processor of the image capturing apparatus 4. Alternatively, again it is not excluded that some or all of the functionality of the verification module 23 could be implemented in dedicated hardware circuitry, or configurable or reconfigurable hardware such as a PGA or FPGA. The verification module 23 may be integrated into the same unit as the camera 20 and/or image processing module 22, or may be separate from one or both of them.

There are a number of possibilities for the automated verification by the verification module 23.

In embodiments the timestamp obtained from the coded light can be used to verify a pre-existing timestamp associated with the image. In one such embodiment the image processing module 22 is configured to decode the timestamp again later from the one or more stored images, and the verification module 23 is configured to compare this with the stored timestamp in the metadata 34 in order to verify the stored timestamp. For instance it may be desired to check that the image has not been tampered with. In that case, the timestamp as previously decoded from the image (e.g. at the time of capture) and stored in association with it (e.g. in metadata 34 in the image file 30) should match the timestamp as decoded from that (allegedly) same image on a subsequent occasion. The verification module 23 is arranged to check this by comparing a stored version of the timestamp with a version of the (supposedly) same timestamp now extracted from the stored image.

As another example, the camera 20 is one which adds its own timestamp to at least one of the one or more the images, and the verification module 23 is configured to compare the camera's own timestamp with the decoded timestamp in order to verify the camera's timestamp. For instance it may not be certain whether the camera's time-stamping is reliable or trustworthy, or it may not be known whether the timestamp added by the camera has been tampered with. The verification module 23 may be configured to verify this by checking the camera's (apparent) timestamp against the coded light timestamp extracted from the image in question.

In one example the timestamp is encrypted using a symmetric or asymmetric cipher, such that the timestamp is provided in encrypted format and a corresponding decryption key is required to access the timestamp. In this manner it will be difficult for a third party to provide a "fake" timestamp.

In yet another example, the timestamp as modulated into the light is signed using a private key of a trusted party, e.g. a private key of an operator or supplier of the light source 2, or an associate thereof. In this example, the verification module 23 is configured to verify the decoded timestamp using a corresponding public key.

In one advantageous implementation the message comprising the timestamp also comprises a cryptographic hash signed with a private key of a private-public key pair (and optionally a digital certificate to aid verification). The verification module 23 can then verify authenticity of the data using the corresponding public key, i.e. the device can verify that the timestamp did indeed originate from a light source 2 of the trusted operator, supplier or associate.

Preferably proof of authenticity is provided using a cryptographically signed hash of the timestamp in conjunction with the time stamp.

$$\text{Timestamp}_1 = \text{Timestamp} | E_{PK}(\text{Private key}, f_{hash}(\text{Timestamp}))$$

wherein the "|" operator signifies concatenation of data, the $f_{hash}$ represents a cryptographic hash function, and the $E_{PK}(.)$ function represents an asymmetric public key cipher.

$\text{Timestamp}_1$ above allows the verification of the Timestamp by decrypting the hash using the corresponding public key of the cryptographic key-pair, calculating the cryptographic hash of the timestamp, and comparing the decrypted and calculated hash values.

In further embodiments, optionally the image processing module 22 may be configured to remove the modulation from said one or more images once the timestamp has been decoded, stored or verified. Although the modulation in the coded light is generally too high frequency to be visible, it is possible in some situations that it could leave artifacts in the captured image. To avoid this, the image processing module 22 may be configured to detect when the timestamp has been used (e.g. by detecting it has now been displayed to the user, incorporated as a graphical element 28 in the image, stored as metadata 34 and/or verified by the verification module 23), and then subsequently cancel the coded light component from the image data 32 as stored in the stored image file 30 and/or as displayed on screen to the user.

For example when the coded light signal is modulated in a manner analogous to WO 2012/127439, then the coded light signal typically leaves a signal around the lights or on the area illuminated by the lights. This manifestation of the data from the coded light signal within the resulting image may be considered as undesirable by the viewer. To this end post-processing may be used to remove part of the resulting patterns. Part of the coded light detection is to determine the footprint of the coded light; i.e. where in the image the coded light signal is available. After decoding the very same footprint may be used to filter out the coded light signal from the image, e.g. by means of a filter that primarily filters in the direction orthogonal to the lines of the rolling shutter, thereby reducing the visibility of the coded light signal within the footprint.

In particular in the latter case, preferably care should be taken that the information (timestamp, optional location data and/or identifier, or similar data) stored in the metadata is stored in a manner that uses cryptographic techniques to prevent or at least complicate tampering.

One possible solution to this effect would be to have the camera use cryptographic techniques to secure the timestamp, or the entire metadata, using cryptographic techniques, thereby rendering it more difficult to tamper with the timestamp data. The timestamp could be encrypted using a symmetric or asymmetric cipher, such that only an application with the corresponding keys can access the timestamp. Alternatively the camera may provide the timestamp combined with a cryptographically signed hash covering at least the timestamp (and optionally a digital certificate to aid verification). By using these cryptographic techniques the authenticity of the timestamp can be verified even after any visible artefacts in the still or video images have been removed through post-processing.

Preferably proof of authenticity is provided using a cryptographically signed hash of the timestamp (or the entire metadata) in conjunction with the time stamp.

$$\text{Metadata}_1 = \text{Timestamp} | E_{PK}(\text{Private key}, f_{hash}(\text{Timestamp}))$$

wherein the "|" operator signifies concatenation of data, the $f_{hash}$ represents a cryptographic hash function, and the $E_{PK}(.)$ function represents an asymmetric public key cipher.

Metadata$_1$ above allows the verification of the Timestamp by decrypting the hash using the corresponding public key of the cryptographic key-pair, calculating the cryptographic hash of the timestamp, and comparing the decrypted and calculated hash values.

Note therefore, there are two possibilities given in the above description for the use of a cryptographically signed hash. The first is in the coded light signal (which is as secure as the coded light system is secure), and the second is in the proof as generated in the camera (which is as secure as the camera is secure). There are some differences between the first and second cases, the main difference being the available bandwidth. The cryptographically signed hash is typically fairly short—it is kind of a checksum that is difficult to fake. But to verify the checksum, this requires the public key and certificate. The certificate is the public key needed to decrypt the hash which in turn is signed by a trusted third party. So the certificate allows for checking that the public key (needed to check the hash) is approved of by the trusted third party. This certificate may take up quite a number of bits, which can be readily append to a file like a JPG, but in some systems may be more than can be readily transmitted over coded light (e.g. would require a long detection time). Hence in some embodiments with limited coded light bandwidth, the inclusion of the certificate with the timestamp may be more applicable to the second case where the hash is applied by the receiving camera rather than the first case where it is applied in the coded light signal. Alternatively, in either case, the public key and/or certificate could be distributed by a separate means (e.g. via a network or memory stick).

In further embodiments, in addition to one or more of the above forms of automated verification by the verification module 23, the timestamp may optionally also be output to a user, allowing the user him- or herself to verify the time at which the image was captured. In this case, what is being verified is the user's own perception, impression, memory or belief of when the image was captured or purported or alleged to have been captured. For instance the user may recognize the event in the image but wish to have confirmed his or her memory of when the event took place. Or as another example, the user may be shown the image by another who reports the event to have taken place at a certain time, but the user wishes to check that other person's assertion.

Figure 6:
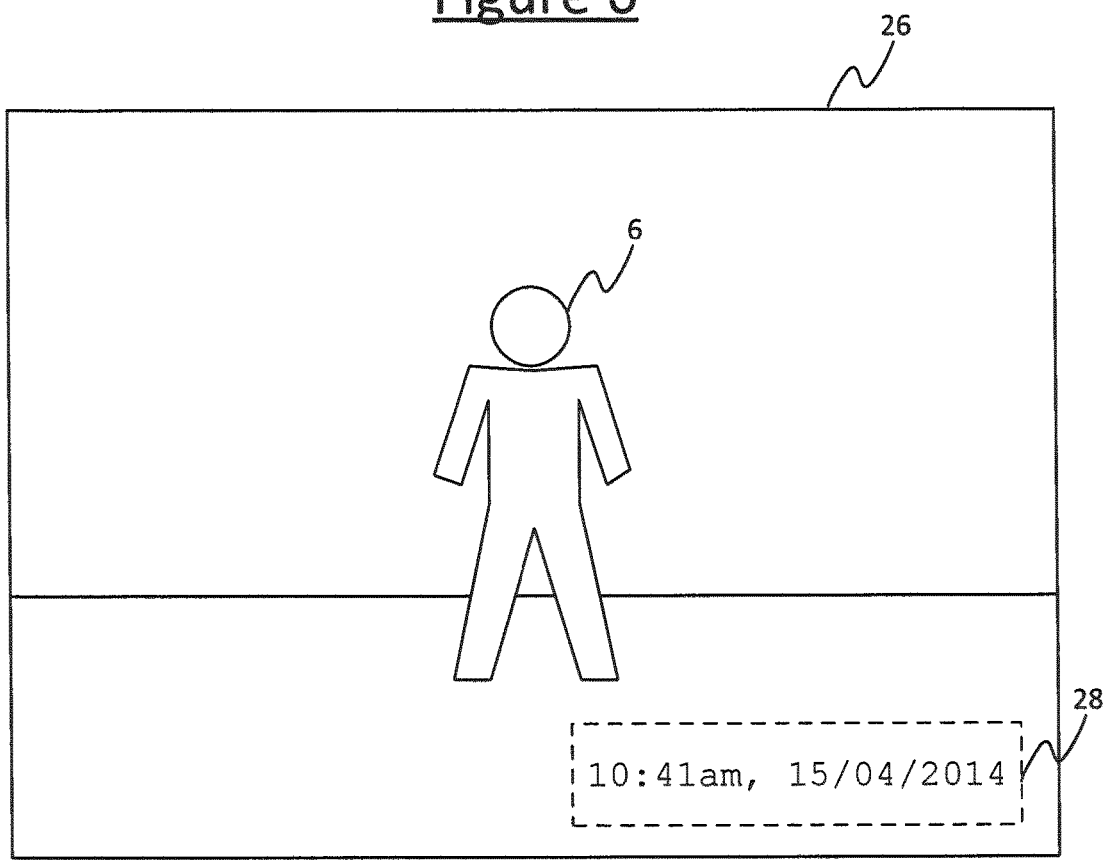

For example as illustrated in FIG. 6, the image processing module 22 may be configured to modify the actual image 26—i.e. the actual pixels of the image—to incorporate an indication of the timestamp as a graphical element 28 in the image, and to store the image in this modified form. When the user retrieves this modified, stored image to view on screen, he or she will see the timestamp 28 integrated graphically into the pixels of the image (N.B. "graphical element" here does not necessarily exclude text included as image data as part of an image). The image processing module 22 may also write-protect or encrypt the modified image 26 to prevent tampering.

Another example is based on the scenario shown in FIG. 7. As described above, the image processing module 22 may be configured to store an indication of the timestamp in the metadata 34 of the image file 30. In the embodiment of FIG. 6 it is the actual image data 32 which is modified to indicate the timestamp rather than the timestamp being included as metadata, but in the embodiment of FIG. 7 the timestamp is indicated in the metadata 34. As well as this being able to be used by the verification module 23, the user him- or herself can also view the timestamp from the metadata 34, e.g. by viewing file details of the file 30 in a file system, operating system or browser on a computer.

As an addition to any of the above techniques, optionally the controller 10 of the light source 2 may also be configured to encode an indication of the light source's location into the light it emits. Thus the image processing module 22 at the receive side is further able to obtain, from the processing of the one or more images, information indicative of the location at which the one or more images were captured.

This information may take a number of possible forms. In embodiments, the location information may comprise geographic coordinates or a name of the location embedded directly into the light, e.g. as the GPS coordinates of the light source 2 (the light source 2 may even be equipped with a GPS receiver for this purpose) or name of the location that is meaningful to a human (e.g. name of a room, building, street, etc.). Alternatively, the location information embedded in the light may comprise an identifier of the light source 2 that is mapped to a location in a location database (not shown). In this case the image processing module being configured to look up the location from the location database based on said identifier.

Thus, in accordance with everything discussed above, the disclosed system can provide a kind of "watermarking" which creates a proof of when and optionally where an image was captured, e.g. allowing a user to demonstrate "I was there".

In embodiments, any of the verification techniques discussed above in relation to the time stamp may be applied to this "location stamp". For example the captured image stored in the image file 30 may be modified to incorporate the location as a graphical element 28 analogous to FIG. 6, and/or the location may be included in the metadata 32 of the stored image file 30 as in FIG. 7. Alternatively or additionally, the information indicative of the location may be encrypted or cryptographically signed in the coded light signal, and/or encrypted or cryptographically signed at the camera, in similar manner to any of the options discussed above in relation to the timestamp.

Although the invention has been primarily been presented with the verification of timestamps in mind, possibly in combination with location information, it may equally be advantageous to create a system wherein the coded light only comprises location information rather than both timestamp and location information. Such a system would provide a further ability to verify where the image/footage was recorded, instead of when it was recorded. Such a device would be similar to the claimed device in that it would be a device comprising an input for receiving images captured by a camera, of an environment illuminated by light from a visible light source; and an image processing module configured to process one or more of the images to decode a data representing a location modulated into said light, and to output an indication of the decoded location for verification of a location where the one or more images were captured.

In yet further embodiments, any of the above techniques may be combined with a facial recognition algorithm or other image recognition algorithm in order to additionally identify a person (or even multiple people) in any of the one or more images from which the timestamp (and in embodiments location stamp) has been decoded—i.e. to detect the presence of a person (human) and to identify who that person is. For instance, if a face or part of a face can be discerned in one or more of the images, this may allow the facial recognition algorithm to identify the person to whom that face belongs. Or if the person is wearing a distinctive item such as a special badge, or distinctive clothing, optionally combined with other factors such as height, hair color, build, etc., it may be possible for an image recognition algorithm other than a facial recognition algorithm to identify the person (or both types of algorithm could be combined for a more robust identification). Whatever type of recognition algorithm is used, the person may be identified in terms of any suitable identifier, such as a personal name ("Dave Smith" or the like), or a nickname, or an email address, or a username of a certain communication system such as a username of a social networking system or VoIP system.

In embodiments, the facial and/or other image recognition algorithm may be combined into an app or other application along with the timestamp detection and location stamp detection, to log the fact that the identified person or person was at a certain place at a certain time (and therefore enable a user to prove that fact). For example this could be used as part of one or more of: a location-based game (where a result in the game depends on the person or persons being at one or more specified locations at a specified time or times), a retail rewards scheme (where a reward to the user depends on the user having been at one or more specified locations at a specified time or times), a social networking system (where the user may wish to prove that his or her activity is real), and/or a celebrity spotting application (e.g. to automatically detect celebrities in images, or prove that the user was present in an image with the celebrity at a certain place and time).

The application may log the fact of the identified person or person being at the verified location at the verified time in a number of ways. For example this may be logged locally on a user device of the user, e.g. on portable user device such as a smart phone, tablet or laptop comprising the camera 20, image processing module 22 and verification module 23 incorporated into that user device. This way, the user can show one or more others (e.g. friends, retail personnel, security personal, etc.) that the identified person or person was found at the time and place in question by showing them the logged result on a local user interface (e.g. screen) of the portable user device. As another example, the fact of the identified person or persons being at the verified location at the verified time could be logged on a server or other computer via a network. E.g. the user may submit a captured image from the camera 20 over a wide area network (WAN) such as the internet or a mobile cellular network (e.g. 3GPP network) to a server, at which the verification module 23 is implemented. E.g. this could be a server of a social networking system, or a server hosting a location-based game. This way the verification can be performed centrally and made available to one or more other users to see.

There are various possible applications of the above techniques. For instance, the need for verification may exist in a game. Take for example a game in which players have to travel according to a predetermined itinerary (predetermined schedule for a predetermined journey, route or set of locations). Evidence that the players were indeed present at locations which are part of the itinerary at certain time slots can be verified by means of captured images. The images may be created by means of fixed cameras at the locations in question, or alternatively the images may be captured by means of mobile devices of the players. More and more mobiles with cameras are designed to take so-called "selfies" which contain the face of the person who took the image. The image which is captured by the player of the game at a certain location at the certain moment can then be verified automatically by a device or application according to the invention. This device or application could be implemented in the mobile user terminal which was used to capture the image (e.g. as part of a "selfie contest"). Alternatively the device or application may be (at least partly) implemented remotely. The device or application may then, e.g. shortly after the capturing of the image, verify whether the image was indeed made at the relevant location within a certain time slot based on knowledge of the codes in the emitted light of the light sources at that location. The device or application can compare the code which is embedded in the emitted light with codes which have been provided as part of the game. Preferably the device or application is also capable of facial recognition. By combining code verification and facial recognition the device can verify that the user who is recognized in the image was present at the location at the specific time.

As another example application, many people want to show to others (friends, family, etc.) that they have been at certain location—not as part of a specific game, but just as part of the social interaction with the others. The above-disclosed techniques can be used to support this type of social interaction.

In another example, the code in the emitted light comprises or is based on a timestamp and preferably also related to a kind of game. By "based on" here, it is meant that the code which is transmitted does not have to be a direct indication of the actual time. It also means that the signal in the emitted light is not constant over time, but rather fluctuates as function of time. The game is based on collecting points by being present at a certain location at a certain moment. For instance in bars or pubs, there are spots which are typically occupied by the most senior guys or the alpha types. Showing by means of an image that the user (or another person) was at such spot at a certain time can be important in the social game.

Another use of creating evidence that the user was at a certain location at a certain time may be found in retail. For instance, customers may receive discounts, or faster service, by providing evidence that they were in the shop or at another location. Again the image must be captured in the neighborhood of light sources emitting specific (time based) codes or with the light sources even directly visible in the images.

Yet another possible application is to use facial recognition for identifying or authenticating an alleged identity of a further person (say a celebrity) in the same image or sequence of images, and automatically verifying that the image supports an assertion that the particular/multiple persons in question was/were present (together) at the same location at the same time.

It will be appreciated that the above description for clarity has described embodiments of the invention with reference to different functional units and/or processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention.

Another embodiment relating to a computer program product comprises computer-executable instructions corresponding to each means of at least one of the systems and/or products set forth herein. These instructions may be subdivided into sub-routines and/or stored in one or more files that may be linked statically or dynamically. When provided on a carrier, the carrier of a computer program may be any entity or device capable of carrying the program. For example, the carrier may include a storage medium, such as a ROM, for example, a CD ROM or a semiconductor ROM, or a magnetic recording medium, for example, a hard disk. Alternatively, the carrier may be an integrated circuit in which the program is embedded, the integrated circuit being adapted to perform, or used in the performance of, the relevant method.

It will be appreciated that the above embodiments have been described by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A device comprising:
an input for receiving images captured by a camera, of an environment illuminated by light from a visible light source;
an image processing module configured to process one or more of the images to decode a timestamp modulated into said light, and to output an indication of the decoded timestamp; and
a verification module arranged to receive the indication of the decoded timestamp output by the image processing module, and based thereon to perform an at least partially automated verification of a time at which the one or more images were captured by comparing the timestamp as currently decoded from said image with a previously determined version of the timestamp;
wherein the image processing module is further configured to apply a facial recognition and/or other image recognition algorithm to at least one of the captured images, and to thereby identify a person or persons appearing in the at least one image.

2. The device of claim 1, wherein the image processing module is further configured to decode, from the processing of the one or more images, information modulated into the light indicative of a location of the light source or environment, and to output an indication of the location for verification of a location at which the one or more images were captured.

3. The device of claim 2, wherein said information comprises:
coordinates or a name of the location explicitly encoded into the light; or
an identifier of the light source that is mapped to a location in a location database, the image processing module being configured to look up the location from the location database based on said identifier.

4. The device of claim 1, wherein the timestamp is cryptographically secured, and the image processing module is configured to use a cryptographic key to access the timestamp.

5. The device of claim 1, wherein:
the image processing module is configured to store the one or more images in at least one image file, wherein said outputting comprises storing the decoded timestamp in the image file as metadata of the image file, said previously determined version of the timestamp being the stored decoded timestamp;
the image processing module is configured to decode the timestamp again later from the one or more stored images; and
the verification module is configured to perform said at-least-partially automated verification by comparing the later decoded timestamp with the stored timestamp in the metadata in order to verify the stored timestamp.

6. The device of claim 5 wherein the timestamp in the metadata or the metadata as a whole is cryptographically secured, and the verification module is configured to use a cryptographic key to access the timestamp or metadata.

7. The device of claim 1, wherein the camera adds its own timestamp to at least one of said one or more the images, said previously determined version of the timestamp being the camera's timestamp, and the verification module is configured to perform said at-least-partially automated verification by comparing the camera's own timestamp with the decoded timestamp in order to verify the camera's timestamp.

8. The device of claim 1, wherein the timestamp as modulated into said light is signed using a private key, and the verification module is configured to perform said at least-partially-automated verification by verifying the decoded timestamp using a corresponding public key.

9. The device of claim 1, wherein the image processing module is configured to remove the modulation from said one or more images once the timestamp has been decoded, stored or verified.

10. An image capturing system comprising:
the device of claim 1;
the light source, being arranged to emit light to illuminate said environment, and configured to modulate the light emitted by the light source with said timestamp indicating a current time value; and the camera, being arranged to capture said one or more images of said environment.

11. A computer program product for processing images, the computer program product comprising code embodied on a non-transitory computer-readable storage medium and configured so as when executed to perform operations of:
  receiving images captured by a camera, of an environment illuminated by light from a light source; and
  processing one or more of the images to decode a timestamp modulated into said light indicating a time at which the one or more images were captured;
  based on the timestamp as determined by said processing, performing an at least partially automated verification of the time at which the one or more images were captured by comparing the timestamp as currently decoded from said image with a previously determined version of the timestamp; and
  apply a facial recognition and/or other image recognition algorithm to at least one of the captured images, and to thereby identify a person or persons appearing in the at least one image.

12. The computer program product of claim 11, wherein the computer program product is further configured to:
  decode, from the processing of the one or more images, information modulated into the light indicative of a location of the light source or environment, and to output an indication of the location for verification of a location at which the one or more images were captured; and
  log the fact that the identified person or the identified persons are verified to have been at said location at said time.

13. The computer program product of claim 12, wherein said logging comprises logging said fact as part of one or more of:
  a location-based game,
  a retail rewards scheme,
  a social networking system, and/or
  a celebrity spotting application.

14. A method comprising:
  using light emitted from a light source to illuminate an environment;
  encoding a timestamp indicating a current time value into the light emitted by the light source;
  using a camera to capture one or more of said environment;
  processing at least one of the images to determine the timestamp encoded into said light; and
  based on the timestamp as determined by said processing, performing an at least partially automated verification of a time at which the at least one image was captured by comparing the timestamp as currently decoded from said image with a previously determined version of the timestamp; and
  applying a facial recognition and/or other image recognition algorithm to at least one of the captured images, and to thereby identify a person or persons appearing in the at least one image.

* * * * *